Jan. 18, 1955 F. R. PIPER 2,699,896
COUNTERACTUATING DEVICE
Filed Oct. 16, 1952 3 Sheets-Sheet 1
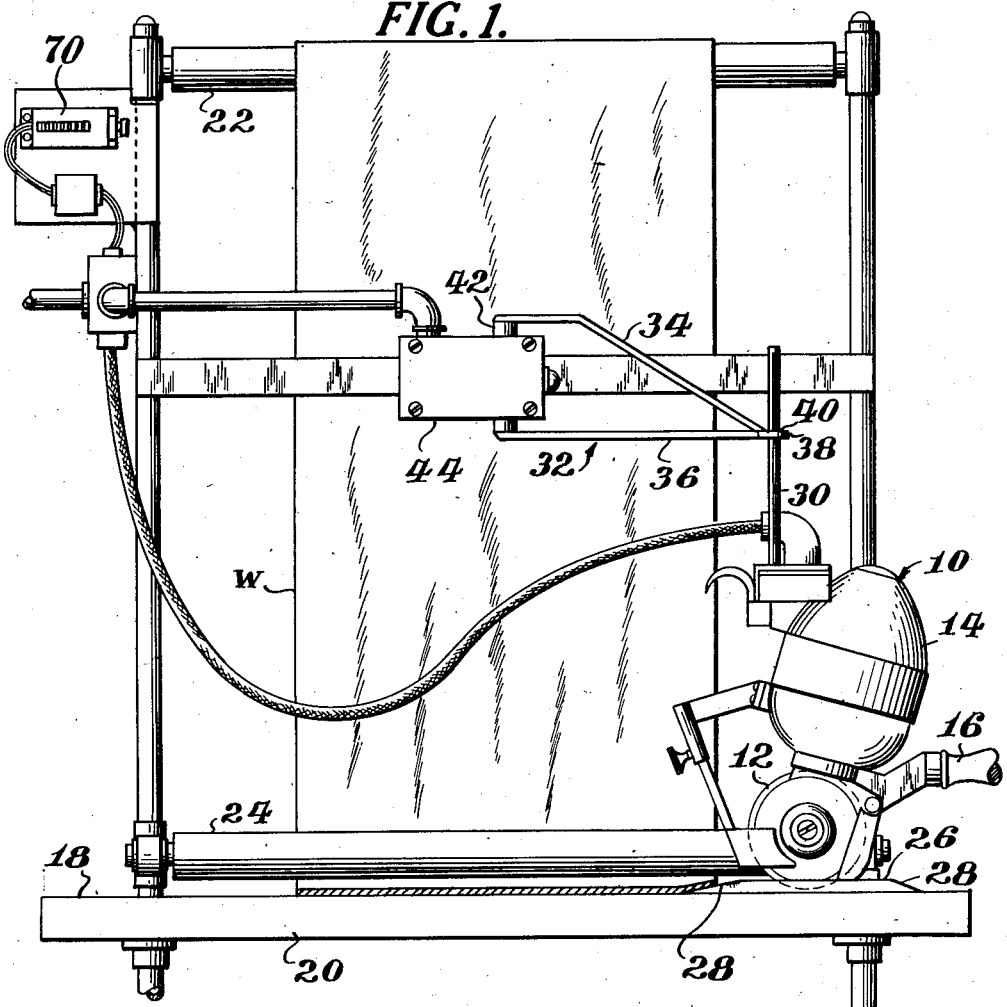
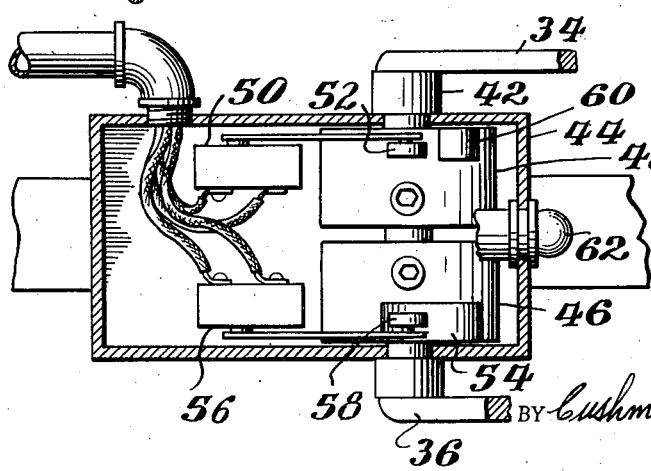
INVENTOR
FRANK R. PIPER
BY Cushman, Darby & Cushman
ATTORNEYS

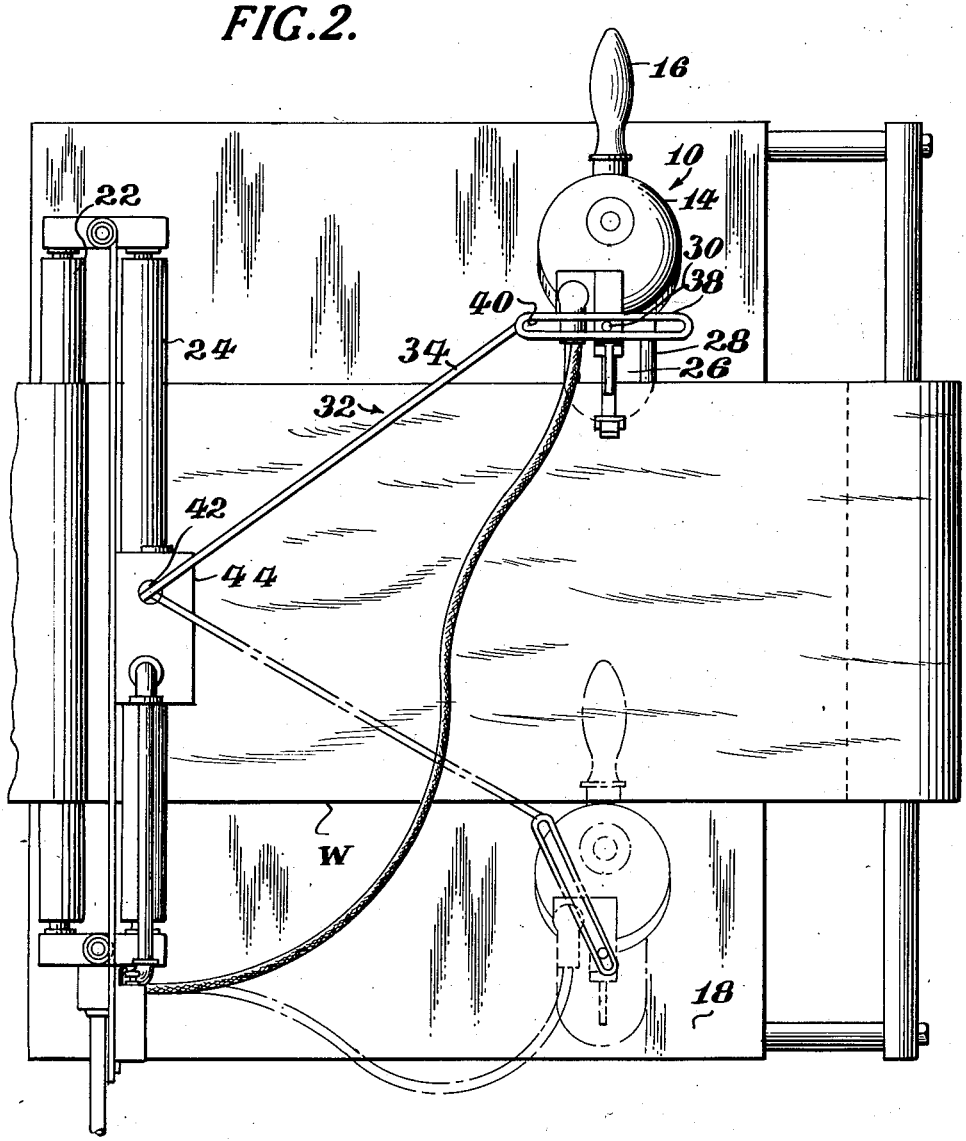

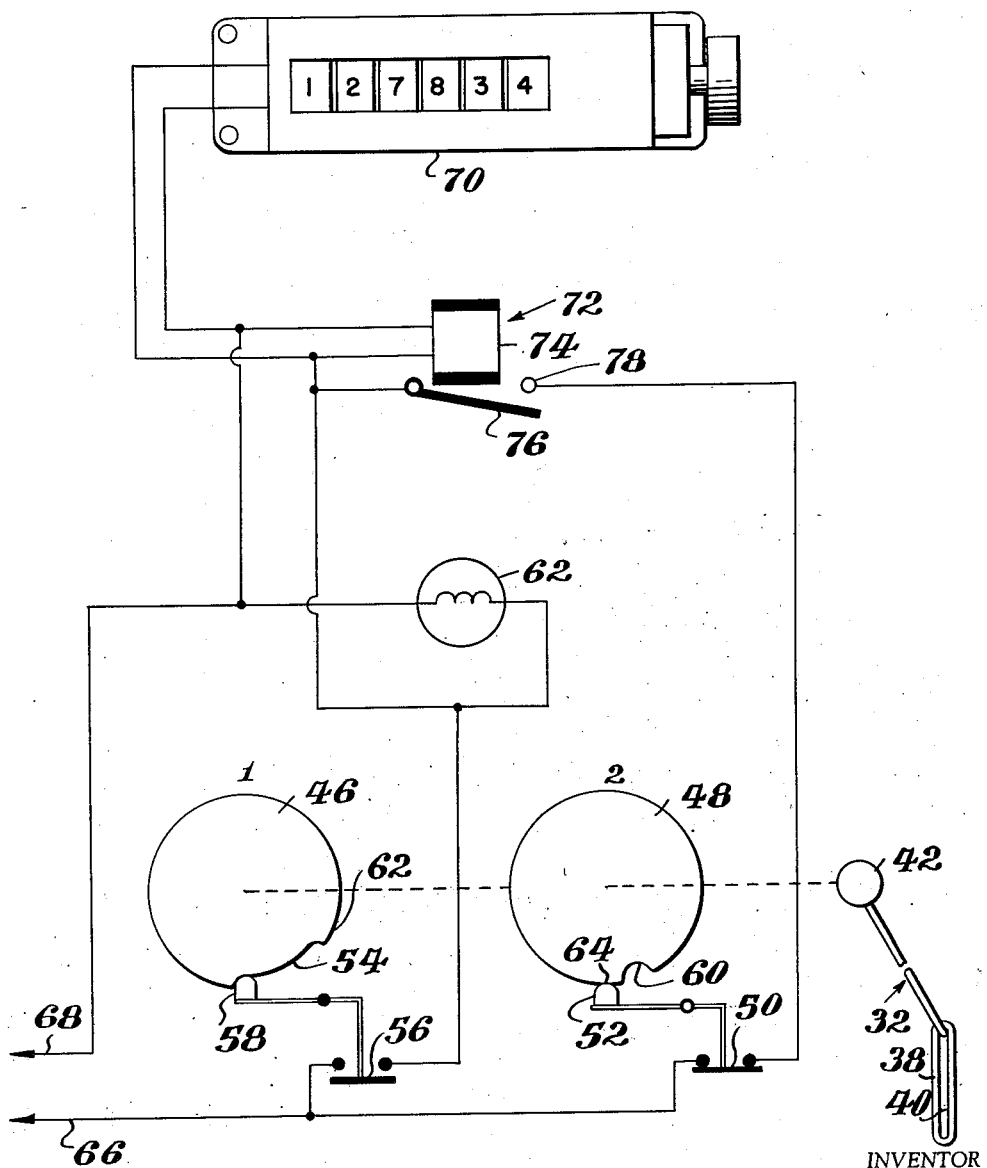

United States Patent Office 2,699,896
Patented Jan. 18, 1955

2,699,896

COUNTER ACTUATING DEVICE

Frank R. Piper, Fairfax, Ala., assignor to West Point Manufacturing Company, West Point, Ga., a corporation of Alabama Application October 16, 1952, Serial No. 315,046

6 Claims. (Cl. 235—92)

This invention pertains to counter actuating devices and particularly pertains to such devices for use in counting the number of cutting strokes of apparatus such as that used for severing a web of material such as a textile.

The use of the invention as associated with hand guided textile cutting apparatus will best illustrate the basic principle of the invention, although restriction to this specific application is not intended. In the cutting of a textile web, a flat table is usually provided over which a cutting apparatus is moved by an operator in what may be termed a first or forward stroke and then a return stroke. In the past, no accurate means have been available for keeping track of the number of forward and return strokes inasmuch as the operator may for some reason stop a stroke short of its complete length or otherwise move the apparatus in an unexpected manner. If such spurious action occurs, all known counter actuating devices will malfunction.

In order to overcome the above stated disadvantages, by the present invention, means are provided for following the motion of the cutting apparatus or whatever other apparatus is employed, but without restricting the motion thereof to any one path, and means are provided for insuring one operation of a counter, but preventing additional operations of the counter, during one complete operation consisting of a forward and return stroke.

Accordingly, it is a primary object of this invention to provide a counter actuating device for actuating a counter once during each forward and return stroke of cutting or like apparatus.

It is a further object of the invention to provide a counter actuating device which does not restrict the path of travel of apparatus, the movements of which are being counted.

It is a further object of this invention to provide, for use with cutting or similar apparatus movable across a cutting area, means for energizing a counter only near the completion of the forward stroke of the apparatus and only resetting the counter for a further operation when the apparatus is near the end of the return stroke.

Further objects and the entire scope of the invention will become further apparent by reference to the following detailed description and to the appended claims.

The invention may be best understood with reference to the accompanying drawings in which:

Figure 1 shows a side elevational view of apparatus embodying the present invention.

Figure 2 shows a top plan view of apparatus embodying the present invention.

Figure 3 shows a view partly in section of a cam operated switching means comprising a part of the present invention, and Figure 4 shows a schematic wiring diagram of the present invention.

Reference character 10 designates a conventional cloth cutter having a rotary cutting knife 12 driven by a suitable motor within housing 14. A handle 16 is provided which an operator may grasp to slide the cutter 10 across the top surface 18 of table 20. A web W of textile material is brought down over a roller 22 and is then trained under roller 24 so that the web W may be laid out flat on surface 18 as shown.

The cutter 10 is further provided with a shoe 26 which is beveled about the edges thereof as at 28 so that it will readily pass beneath and lift up the web W. Thus, the operator by grasping handle 16 may push the cutter across the surface 18 and in so doing the shoe 26 will pass under the web W and the rotary knife 12 will sever the web.

It will be appreciated that in handling and cutting the web, it is preferable that the web not have to be precisely located on the table surface and thus some freedom may be provided in the exact path which the cutter 10 must follow in traversing the required distance.

For the purposes of the present invention, the conventional cutter 10 as described above, is provided with a post 30 extending upwardly from any suitable mounting on the cutter. An arm means 32 consisting of an upper portion 34 and a lower portion 36 is then provided, this arm means being also provided with an extension 38 in which is formed a slot 40 for freely receiving the post 30 which extends from the cutter 10.

The upper arm portion 34 and lower portion 36 at their ends remote from extension 38 are fixedly secured to a shaft 42 which is mounted for rotation in a housing 44. The housing 44 is fixedly mounted by any convenient means on the framework which supports the rolls 22 and 24 or any other fixed structure. Referring to Figure 3, within housing 44 a first cam 46 and a second cam 48 are fixedly secured to shaft 42 so as to rotate therewith. Positioned in operative relationship with the first cam 46 is a first switch 56 having a cam follower 58 positioned to operate in the detent 54 cut in cam 46. Positioned in operative relationship to second cam 48 is a second switch 50 having a cam follower 52 for operation in detent 60 of cam 48. Also mounted in a side wall of housing 44 is a pilot light 62.

From the foregoing, it is thought apparent that as the cutter 10 is moved across the surface 18 the post 30 will cause the arm means 32 to be rotated about the axis of shaft 42, and shaft 42 will thus rotate through the same angle.

It is an important aspect of the invention that the cutter 10 may actually traverse any irregular path which may deviate transversely according to the length of the slot 40 in the arm extension 38.

Referring now to Figure 4, cams 46 and 48 are shown in the position they will occupy when the cutter 10 is in the starting position as shown in Figure 1. The detent 54 in cam 46 is preferably elongated so that the cam follower 58 of switch 56 will not be operated to close switch 56 until the cutter 10 has reached a position near the end of the forward or cutting stroke of the cutter. However, at the end of the cutting stroke the cam follower 58 will have reached a position designated 62 and switch 56 will be closed.

The detent 60 in cam 48 is relatively short and is located within the limits so to speak of the detent 54 of cam 46. In other words, in the position shown in Figure 4, the cam follower 52 of switch 50 will be resting on an elevated point 64 of cam 48 and switch 50 will be closed. As the cutter 10 is moved in its forward stroke, cam follower 52 will momentarily fall into detent 60 and switch 50 will be momentarily opened. However, switch 50 will be immediately re-opened and will remain open for the duration of the forward stroke.

A suitable electric supply on conductors 66 and 68 is provided for energizing a conventional electromagnetically operated counter 70 through switches 50 and 56 and relay 72. Conductor 66 is connected to one contact of each of switches 50 and 56. The other conductor 68 is directly connected to one terminal of the counter 70, one terminal of coil 74 of relay 72 and one terminal of the pilot light 62. The second terminal of switch 56 is connected to the second terminal of the pilot light 62, to the second terminal of relay coil 74, to the second terminal of the counter 70 and also to relay arm 76 of relay 72. The second terminal of switch 50 is connected only to contact 78 of relay 72.

When the cutter 10 is advanced in its forward stroke from the starting position as shown in Figure 1, the counter 70, relay 72, and pilot light 62 will be energized only near the completion of the stroke, when cam follower 58 of switch 56 has reached point 62 of cam 46. It will be appreciated that any false starts of the cutter by the operator will not have resulted in an actuation of the components just recited.

When relay 72 is energized as just described, the relay arm 76 will be engaged with contact 78 and thus a holding circuit is established through the switch 50 and relay arm 76. This holding circuit will remain as the return stroke of the cutter proceeds notwithstanding that cam follower 58 moves into detent 54 to move switch 56 to open position. The holding circuit will be broken only near completion of the return stroke when cam follower 52 moves into detent 60 to open switch 50. The opening of switch 50, while switch 56 is open, breaks the holding circuit through relay arm 76 and arm 76 moves away from contact 78. In the final position of the cutter, cam follower 52 will have moved out of detent 60 and will be at point 64 of cam 48, again closing switch 50. However, since 56 is open, the holding circuit will not be re-established until another forward stroke is undertaken and cam follower 58 is again at point 62 of cam 46. It will now be further appreciated, the counter 70 having been energized, nothing but a full return stroke of the cutter 10 will serve to re-establish the original circuit so that another count may be entered in counter 70.

From the foregoing, it will be clearly understood that the present invention provides counter actuating apparatus which is substantially foolproof and at the same time does not severely restrict the movement of the device which operates the counting apparatus.

It will be understood that the illustrated embodiment of the invention is only for purpose of description and the true scope of the invention is to be determined from the appended claims.

What is claimed is:

1. A counter actuating device for use with apparatus movable by hand within a predetermined area of motion, said device comprising means connected with said apparatus for operating a counter at an advanced position of the apparatus when the apparatus is moved from a first position to the advanced position, said connecting means between the counter and the apparatus including an arm means, a first cam and a second cam means both fixed to a common shaft rotatable by said arm means, a first cam follower and a second cam follower mounted in operative relationship to the first and second means respectively, first and second switch means connected to the first and second cam follower means respectively, a circuit connected with the first and second switch means for energizing the counter, the first cam being cut to operate said first switch means to operate said circuit when the apparatus is at said advanced position, a holding relay in said circuit connected to be held closed until the second switch means operates said circuits, the second cam being cut to operate said second switch means to open said circuit only when the apparatus has been substantially returned to said first position.

2. A counter actuating device for use with apparatus freely movable by hand within a predetermined area of motion, said device comprising means movably connected with said apparatus for operating a counter at an advanced position of the apparatus when the apparatus is moved from a first position to the advanced position, said connecting means between the counter and the apparatus including an arm means, a first cam and a second cam both fixed to a common shaft rotatable by said arm means, a first cam follower and a second cam follower mounted in operative relationship to the first and second cams respectively, first and second switch means connected to the first and second cam follower means respectively, a circuit connected with the first and second switch means for energizing the counter, the first cam being cut to operate said first switch means to operate said circuit when the apparatus is at said advanced position, a holding relay in said circuit connected to be held closed until the second switch means operates said circuit, the second cam being cut to operate said second switch means to open said circuit only when the apparatus has been substantially returned to said first position.

3. A counter actuating device for use with apparatus movable by hand within a predetermined area of motion, said device comprising a counter, and means connected with said counter and said apparatus for operating the counter at an advanced position of the apparatus when the apparatus is moved from a first position to the advanced position, wherein the connecting means between the counter and the apparatus includes an arm means, a first cam and a second cam both fixed to a common shaft rotatable by said arm means, a first cam follower and a second cam follower mounted in operative relationship to the first and second cams respectively, first and second switch means connected to the first and second cam follower means respectively, a circuit connected with the first and second switch means for energizing the counter, the first cam being cut to operate said first switch means to operate said circuit when the apparatus is at said advanced position, a holding relay in said circuit connected to be held closed until the second switch means operates said circuit, the second cam being cut to operate said second switch means to open said circuit only when the apparatus has been substantially returned to said first position.

4. A counter actuating device for use with apparatus freely movable by hand within a predetermined area of motion, said device comprising a counter, and means movably connected with said counter and said apparatus for operating the counter at an advanced position of the apparatus when the apparatus is moved from a first position to the advanced position, wherein the connecting means between the counter and the apparatus includes an arm means, a first cam and a second cam both fixed to a common shaft rotatable by said arm means, a first cam follower and a second cam follower mounted in operative relationship to the first and second cams respectively, first and second switch means connected to the first and second cam follower means respectively, a circuit connected with the first and second switch means for energizing the counter, the first cam being cut to operate said first switch means to operate said circuit when the apparatus is at said advanced position, a holding relay inside circuit connected to be held closed until the second switch means operates said circuit, the second cam being cut to operate said second switch means to open said circuit only when the apparatus has been substantially returned to said first position.

5. A counter actuating device for use with apparatus freely movable by hand within a predetermined area of motion, said device comprising means movably connected with said apparatus for operating a counter at an advanced position of the apparatus when the apparatus is moved from a first position to the advanced position, and means responsive to the position of the apparatus for holding the operating means in the energized condition thereof until the apparatus is returned substantially to said first position, said means connecting the counter with the apparatus including an arm means, an extension on the arm means having a slot therein, and a post mounted on the apparatus and extending through said slot for free movement therein, the extension and slot therein being arranged to lie substantially at right angles to the desired direction of movement of the apparatus, the arrangement being such that the apparatus may be freely moved from side to side during the advancing and returning movements thereof.

6. A counter actuating device for use with apparatus freely movable by hand within a predetermined area of motion, said device comprising a counter, means movably connected with said counter and said apparatus for operating the counter at an advanced position of the apparatus when the apparatus is moved from a first position to the advanced position, and means responsive to the position of the apparatus for holding the operating means in the energized condition thereof until the apparatus is returned substantially to said first position, said means connecting the counter with the apparatus including an arm means, an extension on the arm means having a slot therein, and a post mounted on the apparatus and extending through said slot for free movement therein, the extension and slot therein being arranged to lie substantially at right angles to the desired direction of movement of the apparatus, the arrangement being such that the apparatus may be freely moved from side to side during the advancing and returning movements thereof.

References Cited in the file of this patent

UNITED STATES PATENTS

| | | |
|---|---|---|
| 2,318,372 | Caldwell | May 4, 1943 |
| 2,378,422 | McGoldrick et al. | June 19, 1945 |
| 2,452,022 | Weingart et al. | Oct. 19, 1948 |
| 2,613,873 | Rich | Oct. 14, 1952 |